(12) United States Patent
Anderson et al.

(10) Patent No.: US 7,107,516 B1  
(45) Date of Patent: Sep. 12, 2006

(54) METHOD AND SYSTEM FOR VIEWING IMAGES FROM AN IMAGE CAPTURE DEVICE ON A HOST COMPUTER

(75) Inventors: Eric C. Anderson, San Jose, CA (US); Paul S. Chambers, San Jose, CA (US)

(73) Assignee: FlashPoint Technology, Inc., Raleigh, NC (US)

( * ) Notice: Subject to any disclaimer, the term of this patent is extended or adjusted under 35 U.S.C. 154(b) by 685 days.

(21) Appl. No.: 09/342,680

(22) Filed: Jun. 29, 1999

Related U.S. Application Data

(63) Continuation-in-part of application No. 09/059,611, filed on Apr. 13, 1998, now Pat. No. 6,223,190.

(51) Int. Cl.
*G06F 15/00* (2006.01)

(52) U.S. Cl. .................. 715/501.1; 715/500.1
(58) Field of Classification Search ............ 707/501, 707/500.1; 709/201, 205, 247; 345/302; 715/501.1, 715/500.1, 530
See application file for complete search history.

(56) References Cited

U.S. PATENT DOCUMENTS

| | | | |
|---|---|---|---|
| 5,335,072 A | | 8/1994 | Tanaka et al. ............ 348/232 |
| 5,633,678 A | | 5/1997 | Parulski et al. .......... 348/232 |
| 5,640,193 A | | 6/1997 | Wellner ...................... 348/7 |
| 5,640,204 A | * | 6/1997 | Tsutsui ..................... 348/231 |
| 5,649,186 A | | 7/1997 | Ferguson ................... 395/610 |
| 5,659,729 A | | 8/1997 | Nielsen ...................... 395/603 |
| 5,721,908 A | | 2/1998 | Lagarde et al. ............ 395/610 |
| 5,805,829 A | * | 9/1998 | Cohen et al. .......... 395/200.32 |
| 5,818,977 A | * | 10/1998 | Tansley ..................... 382/294 |
| 5,848,420 A | | 12/1998 | Xu ............................ 707/104 |
| 5,861,918 A | * | 1/1999 | Anderson et al. ......... 348/233 |
| 5,898,779 A | * | 4/1999 | Squilla et al. ............... 380/23 |
| 5,898,833 A | | 4/1999 | Kidder .................. 395/200.64 |
| 5,943,050 A | * | 8/1999 | Bullock et al. ............ 715/783 |
| 6,005,613 A | * | 12/1999 | Endsley et al. ............ 348/231 |
| 6,035,323 A | * | 3/2000 | Narayen et al. ........... 709/201 |
| 6,058,428 A | * | 5/2000 | Wang et al. ............... 709/232 |
| 6,078,756 A | * | 6/2000 | Squilla et al. ............. 396/300 |
| 6,094,221 A | * | 7/2000 | Andersion ................. 348/231 |
| 6,122,409 A | * | 9/2000 | Boggs et al. .............. 382/276 |
| 6,161,131 A | * | 12/2000 | Garfinkle ................... 709/206 |
| 6,334,025 B1 | | 12/2001 | Yamagami ................... 386/96 |

(Continued)

FOREIGN PATENT DOCUMENTS

| | | |
|---|---|---|
| EP | 0650125 A1 | 4/1995 |
| EP | 664475 A1 * | 5/1995 |
| EP | 0890919 A | 1/1999 |
| JP | 2000-287110 | 10/2000 |
| WO | WO98/14887 | 4/1998 |

OTHER PUBLICATIONS fMann, Headmounted Wireless Video: Computer–Supported Collaboration for Photojournalism and Everyday Use, IEEE Jun. 1998, pp. 144–151.*

(Continued)

*Primary Examiner*—Cong-Lac Huynh
(74) *Attorney, Agent, or Firm*—Withrow & Terranova, PLLC

(57) ABSTRACT

A method and system for viewing images from an image capture device on a host computer. The method and system include establishing communication between the image capture device and the host computer, and mounting the image capture device as a disk on the host computer. The method and system further include automatically generating an Internet page description file in the image capture device that references the images stored therein, and accessing the Internet page description file through a standard web browser on the host computer. The user may then view the images stored in image capture device on the host computer through the web browser.

20 Claims, 8 Drawing Sheets

U.S. PATENT DOCUMENTS

| | | | |
|---|---|---|---|
| 6,437,829 B1 * | 8/2002 | Webb et al. | 348/476 |
| 6,571,271 B1 * | 5/2003 | Savitzky et al. | 709/200 |
| 6,779,153 B1 * | 8/2004 | Kagle | 715/522 |
| 6,803,945 B1 * | 10/2004 | Needham | 348/207.1 |
| 6,897,891 B1 * | 5/2005 | Itsukaichi | 348/14.1 |
| 6,965,400 B1 * | 11/2005 | Haba et al. | 348/222.1 |

OTHER PUBLICATIONS

"Phaser 740L Color–Capable Laser Printer," Tektronix, Inc., webmaster@tek.com; Apr. 15, 1999, 2 pages.

"What is Phaserlink Software?", Tektronix, Inc., webmaster@tek.com, Apr. 15, 1999, 2 pages.

Peter Corcoran et al., "A Portable Java API Interface to Simplify User Access to Digital Cameras," IEEE Transactions on Consumer Electronics, vol. 44, No. 3, Aug. 1998, pp. 686–691.

Bill Peisel, "Designing the Next Step in Internet Appliances," Electronic Design, Mar. 23, 2998, pp. 50, 52, and 56.

"Disk Drive with Embedded Hyper–Text Markup Language Server," IBM Technical Disclosure Bulletin, vol. 38, No. 12, Dec. 1995, page 479.

Edward Steinfield, "Leveraging Browsers as Universal GUIs," EE Times, Issue 932, Dec. 16, 1996, 4 pages.

* cited by examiner

METHOD AND SYSTEM FOR VIEWING IMAGES FROM AN IMAGE CAPTURE DEVICE ON A HOST COMPUTER

CROSS-REFERENCE TO RELATED APPLICATIONS

This application is a Continuation-In-Part of U.S. Pat. No. 6,223,190, entitled "A Method And System For Producing An Internet Page Description File On A Digital Imaging Device," filed on Apr. 13, 1998.

FIELD OF THE INVENTION

The present invention relates to a method and system for viewing images from an image capture device on a host computer, and more particularly to a method and system for viewing images from an image capture device on the host computer without having to load device-specific software onto the host.

BACKGROUND OF THE INVENTION

Today's digital cameras look and function similar to analog 35 mm SLR's cameras, except that digital cameras store images digitally in a memory card and include an LCD display that allows the user to instantly view the images directly on the camera. The stored images may then be transferred to a host computer system for viewing, printing, editing and otherwise manipulating the images. In instances where the host computer includes a drive that is compatible with a memory card, such as a notebook computer, the images may be transferred by inserting the digital camera's memory card into the host computer.(e.g., via a PCMCIA slot). instances where the host computer lacks a drive that is compatible with a memory card, the digital camera images may be uploaded to the host computer through some type of communication channel, such as a universal serial bus (USB) or IrDA. To enable the uploading of images and the viewing of the images once on the host, most, if not all, digital cameras are shipped with one or more software applications that provide such functionality once loaded on the host.

One type, of software application shipped with today's digital cameras is a graphics application, such as Adobe PhotoDeluxe or Microsoft Picture It!, that allows a user to edit and manipulate images.

Another type of software application provided with digital cameras is a communication application that enables the graphics application to communicate with the digital camera. The technology underlying most communication applications include Windows OLE Control EXtension (OCX) modules and Twain (Technology Without An Interesting Name) data source modules. In operation, some communication applications insert a "digital camera" option into the graphics application's Import menu that allow the user to select, upload, and manage digital camera images.

Although the present method for allowing the user to upload and view digital camera images on a host computer function adequately, the method has several disadvantages. One disadvantage is that the digital camera must be shipped with a communication application that has been specifically written to communicate with that particular type of digital camera. Consequently, if images from a different type of digital camera are to be uploaded to-the host computer, a completely new camera-specific communication application must be loaded onto the host, typically from a CD ROM or floppy disk that has been included with the digital camera packaging. After loading the appropriate communication application, the user must then learn how to operate it, which depending on the user, may not be a trivial exercise.

Today's digital camera users perceive the notion of having to load camera-specific software onto the host, learn how to use the camera-specific software, tether the digital camera to the host, and then upload the images too burdensome a task just to view images from the camera.

Another disadvantage with the conventional method for uploading digital camera images to the host computer is that the graphics application on the host typically receives the images from the camera in compressed form. The graphics application must then open and decompress each image for display and manipulation. For permanently storing images on the host, the images are then compressed a second time to save space, which degrades image quality if a well-known lossy compression scheme, such as JPEG compression, is used.

Due to such disadvantages the current method for viewing digital camera images on a host computer may be inhibiting the widespread adoption of digital cameras.

Accordingly, what is needed is an improved method and system for viewing images from an image capture device on a host computer without the need for first loading camera-specific software onto the host computer. The present invention addresses such a need.

SUMMARY OF THE INVENTION

The present invention provides a method and system for viewing images from an image capture device on a host computer. The method and system comprise establishing communication between the image capture device and the host computer, and mounting the image capture device as a disk on the host computer. The method and system further comprise automatically generating an Internet page description file in the image capture device that references the images stored therein, and accessing the Internet page description file through a standard web browser on the host computer. The user may then view the images stored in image capture device on the host computer through the web browser.

According to the system and method disclosed herein, the present invention eliminates the need for first loading camera-specific communication software onto the host computer before being able to view the images. And because the image capture device generates the Internet page description file automatically, the user need not have any knowledge of HTML programming to create a web page of the camera images.

DETAILED DESCRIPTION OF THE INVENTION

The present invention relates to a method and system for viewing images from an image capture device on a host computer using a standard web browser. The following description is presented to enable one of ordinary skill in the art to make and use the invention and is provided in the context of a patent application and its requirements. Although the present invention will be described in the context of a still digital camera, various modifications to the preferred embodiment will be readily apparent to those skilled in the art and the generic principles herein may be applied to other embodiments. That is, any digital image capture device which captures, stores, or displays digital images, could incorporate the features described hereinbelow and that device would be within the spirit and scope of the present invention. Thus, the present invention is not intended to be limited to the embodiment shown but is to be accorded the widest scope consistent with the principles and features described herein.

Figure 1:
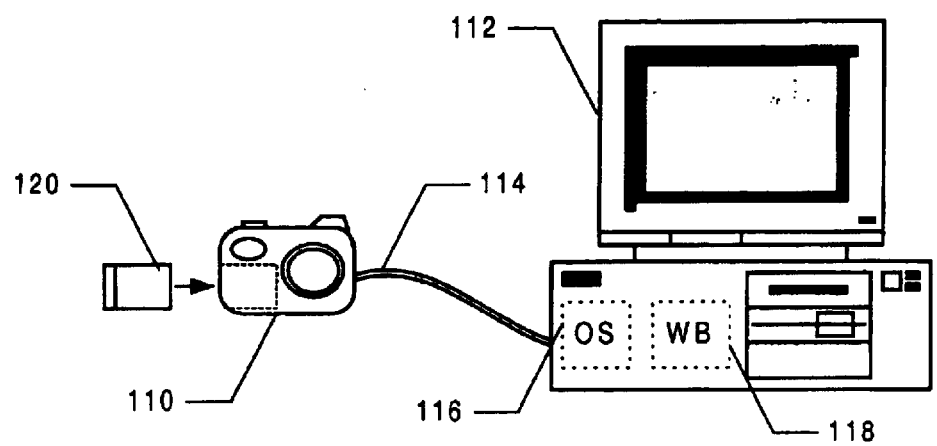
FIG. 1 is a diagram illustrating the system environment for the present invention.

Referring now to FIG. 1, a diagram illustrating a system environment for the present invention is shown. The system includes a digital camera 110 for capturing and storing digital images that is connected to a host computer 112 via a cable 114 or other communication channel. Images are stored in the digital camera 110 on a removable memory card 120 or on internal memory (not shown), and are transferred to the host computer 112 for viewing, storing, printing, and editing the images.

The host computer 112 may represent any well-known microprocessor-based computer system, such as a desktop, notebook, or workstation that is capable of running an operating system 116 including Windows, Macintosh, Unix and Linux, for example. In addition, nearly all such computers include a web browser application 118, such as Netscape Navigator or Microsoft's Internet Explorer, for surfing the Internet. For simplicity, the host computer 112 will hereinafter be referred to as a "PC" 112.

Figure 2:
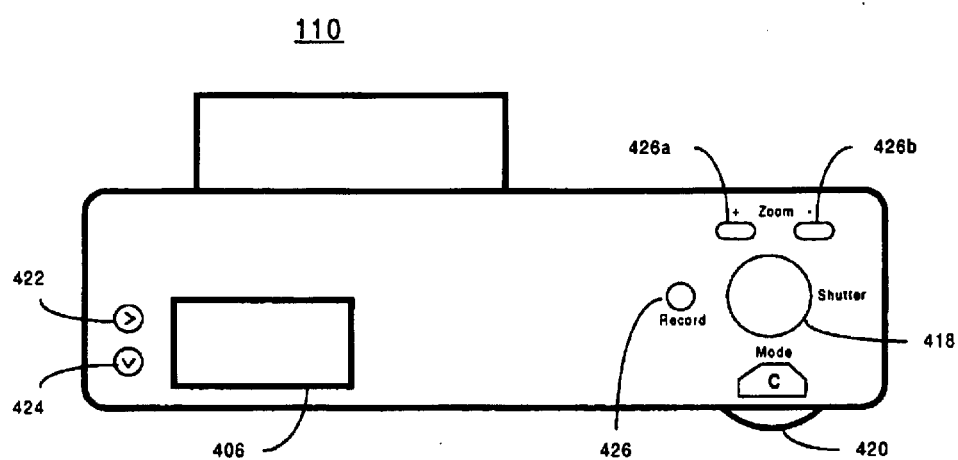
FIG. 2 is a diagram illustrating a top view of the camera.

FIG. 2 is a top view of a typical camera 110 showing a shutter button 418 a mode dial 420, an optional status LCD 406, status LCD scroll and select buttons 422 and 424, a sound record button 426, and zoom-in, zoom-out buttons 426a and 426b. Turning the mode dial 420 places the camera 110 into different operating modes, including capture mode for capturing images, play mode for playing back the captured images on the LCD screen 402, and connect mode for connecting to the PC 112 and transferring images.

As stated previously, conventional methods for transferring images from a digital camera to a PC 112 require that the user first load camera-specific communication software onto the PC 112 that communicates with that particular type of digital camera 110. Not only is this burdensome to the user, but the camera-specific software may not be compatible with any other type of digital camera 110.

This requires that new communication software be loaded onto the PC 112 every time the user wishes to upload images from a different type of digital camera 110.

The present invention overcomes the shortcomings of these conventional methods by providing a method and system for viewing images from a digital camera 110 on a PC 112 without having to first load camera-specific software onto the PC. More particularly, the images stored on the digital camera 110 may be viewed from the PC 112 using a standard web browser and operating system functionality, which leverages the software already included on most computers. This is accomplished by automatically generating an HTML file in the camera 110 that references the images stored in the camera 110, and by connecting the digital camera 110 to the PC 112 as a mass storage device to make the HTML file easily accessible by the computer's web browser, whereby the user may view the camera 110 images through the web browser. Accordingly, the present invention eliminates the requirement that the camera 110 user load camera-specific software onto the host before being able to view the camera 110 images.

Figure 3:
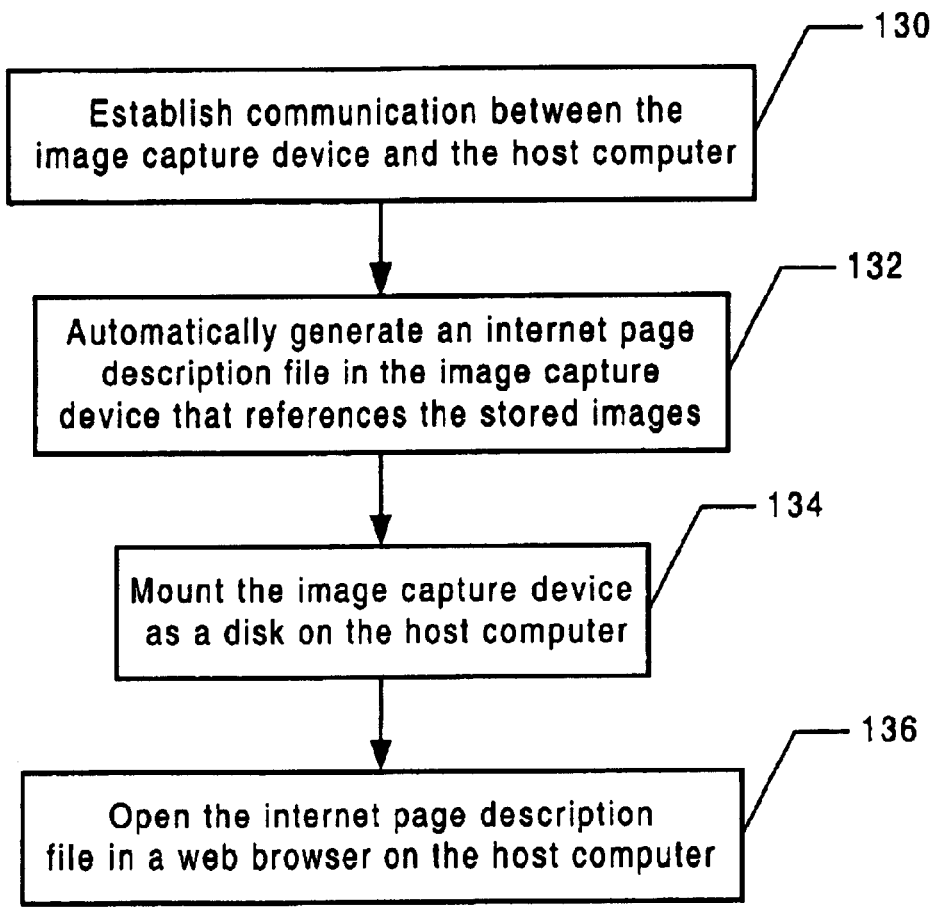
FIG. 3 is a flow chart illustrating the process for viewing images from a digital camera on a PC in accordance with the present invention.

Referring now to FIG. 3, a flow chart illustrating the process for viewing images from a digital camera 110 on a PC 112 in accordance with a preferred embodiment of the present invention is shown. The process begins by establishing communication between the digital camera 110 and a PC 112 in step 130. As used herein, communication is established when the digital camera 110 is physically interfaced with the PC 112 (e.g., by a cable or infrared link), and the digital camera 110 is either placed into connect mode via the mode dial, or the camera 110 automatically enters connect mode upon detection of the physical interface. In a preferred embodiment of the present invention, the physical interface between the digital camera 110 on the PC 112 is established with a universal serial bus (USB) connection.

After communication is established, an Internet page description file is automatically generated within the digital camera 110 that references the digital camera 110's images in step 132. In a preferred embodiment of the present invention, the Internet page description file is implemented as an HTML (hypertext markup language) file, and is hereinafter referred to as such. However, the HTML file may also be, implemented in other formats, such as XML (extensible markup language) format, Acrobat format, and the like. Generating formatted HTML files, however, provides the advantage of being a relatively widespread standard for contemporary web browsers.

In one preferred embodiment, the HTML file is created on the digital camera 110 by a program running on the camera 110, as explained below with reference to FIGS. 8 and 9. After the HTML file has been generated, it is stored in the camera 110's removable memory 120 along with the images.

Figure 4:
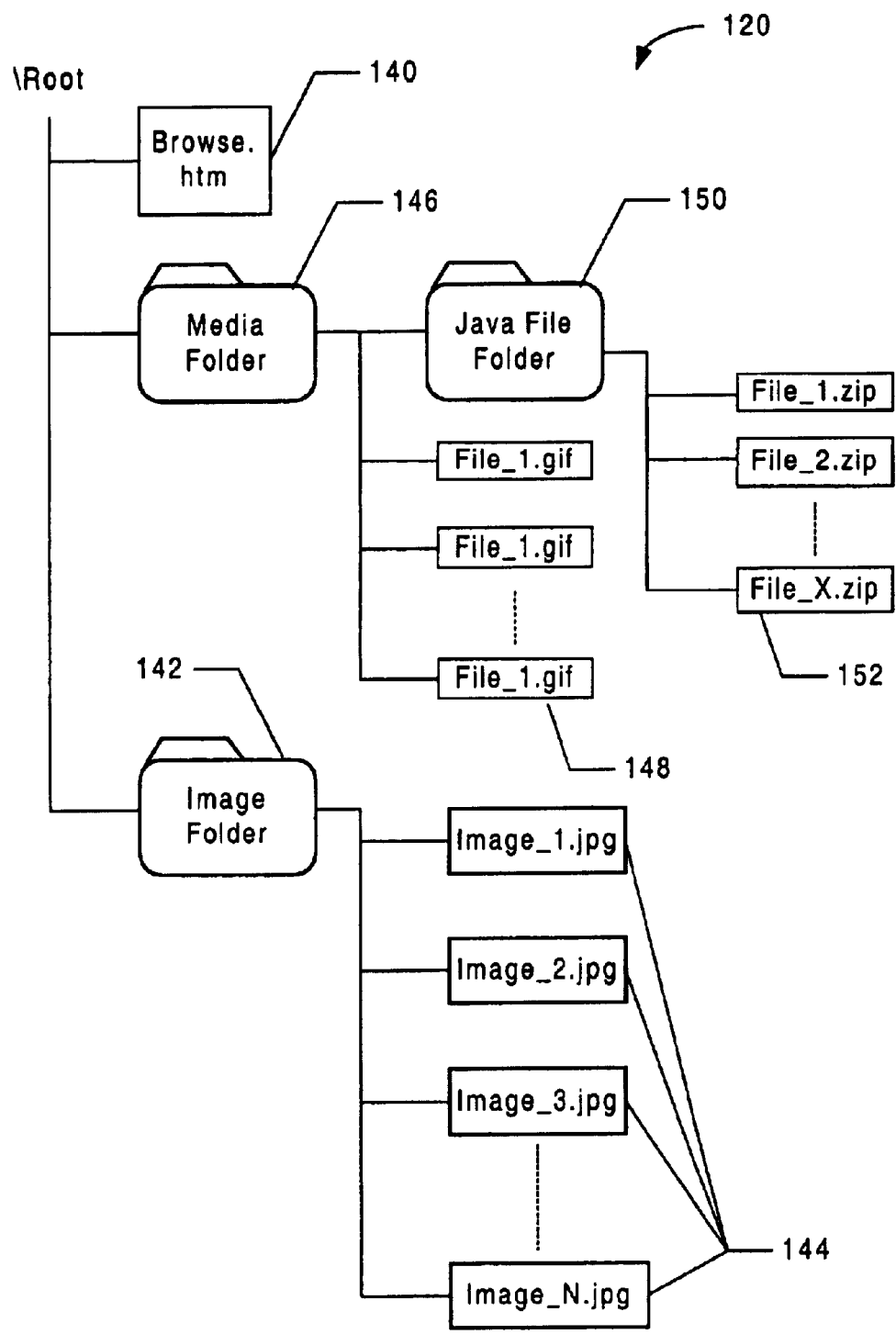
FIG. 4 is a diagram illustrating the contents of the digital camera's removable memory after the HTML file has been generated in accordance with the present invention.

Referring now to FIG. 4, a diagram illustrating the contents of the digital camera 110's removable memory 120 is shown after the HTML file 140 has been generated in accordance with the present invention. The removable memory 120 is preferably configured as a DOS-based file directory, which inherently includes a directory list and a File Allocation Table, or FAT (not shown). The directory list includes all basic file information such as file name, date of creation, and the location of the FAT. The FAT is part of the file system that keeps track of where data is stored-on the disk.

As shown, the directory list typically begins at a root directory. In a preferred embodiment of the present invention, the HTML file 140, shown here with the file name "Browse.htm", is stored in the root directory so as to be readily visible and accessible to the user. Also stored in the root directory is an image folder 142 for storing the images 144 captured by the digital camera 110, and a media folder 146 for storing files referenced by the HTML file 140. The media folder 146 includes several GIF (Graphics Interchange Format) files 148 for displaying any bitmapped graphics referenced in the HTML file 140, and a Java file folder 150. The Java folder 150 contains one or more Java applets 152 for opening and extracting information from the image files 144 referenced in the HTML file 140. Note, the image folder 142 may also contain folders of images, rather than images, such as for-the DCF-98 standard. In this case, the image folder may be named DCIM (digital camera images).

Referring again to FIG. 3, after generating the Internet page description file 140, the digital camera 110 is mounted as a disk drive on the PC 112 in step 134. When communication between the camera 110 in the PC 112 takes place via USB, this is accomplished by specifying to the PC 112 that the digital camera 110 is a USB mass storage device. As will be appreciated by those with ordinary skill in the art, operating systems (OS), such as Windows and Macintosh, support the USB Mass Storage Device Class.

To identify itself as a mass storage device class to the PC's 112 operating system 116, the digital camera 110 includes USB Mass Storage Device Class server-software that operates in accordance with USB protocols to identify to the OS 118 that the device is a mass storage device. In response, the OS 118 loads the appropriate USB drivers that are File Allocation Table (FAT) compatible, and mounts the digital camera 110 as a disk volume. Thereafter the digital camera 110 appears to the PC 112 as a true disk drive (block device).

Although the present invention is described as using a USB standard, any, communication standard utilizing a mass storage device class that is supported by the host-computer operating system 116 may also be used, such as IrDA (infrared) and IEEE 1394 (Firewire), for example.

When a digital camera 110 is typically connected to PC 112, the camera 110 is usually in "command mode" whereby the PC 112 sends commands to the camera 110 to retrieve the images. Therefore, and a preferred embodiment of the present invention, the user is given a choice of manually placing the camera 110 into either command mode or mass storage device mode when connecting camera 110 to the PC 112. Of course, this choice may be programmed as a preference in the digital camera 110, to make the step automatic.

Referring still to FIG. 3, after the HTML file 140 has been generated in the camera 110 and mounted as a disk, the HTML file 140 may be opened in a standard web browser 118 on the PC 112 in step 136. According to the present invention, the images stored on the camera 110 are then accessed and displayed by the web browser 118, without the need to first load camera-specific software on the PC.

It should be understood that the steps involved in the process described in FIG. 3 are order independent. For example, the HTML file 140 may be generated before communication with the host has been established, or portions of the HTML file 140 may even be generated dynamically after the HTML file is opened on the PC 112, as explained further below.

Figure 5:
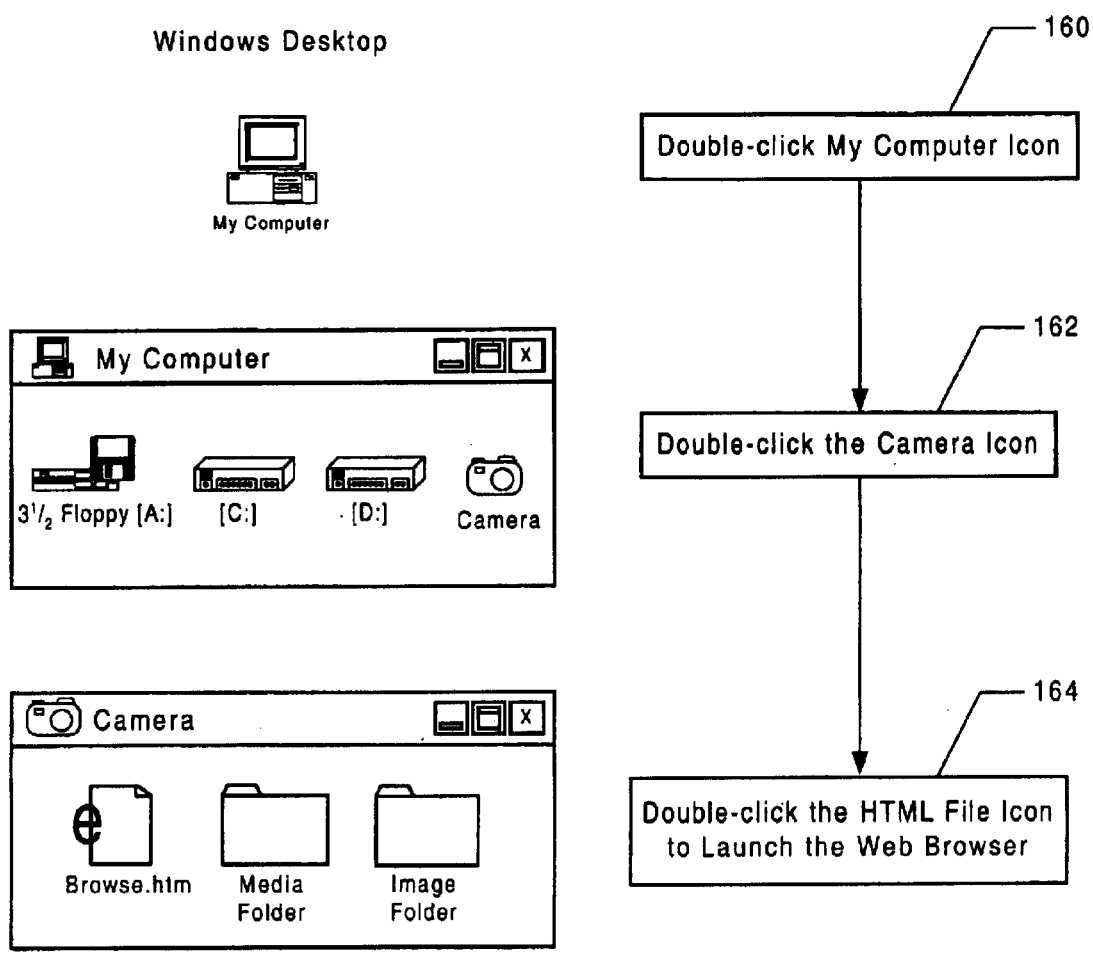
FIG. 5 is a flow chart illustrating the process of accessing and opening the -camera HTML file on a Windows-based PC.

Referring now to FIG. 5, a flow chart illustrating the process of accessing and opening the camera 110 HTML file 140 on a Windows-based PC 112 is shown. After connecting the camera 110 to the PC 112 and placing the camera 110 in connect mode, as explained above, the camera 110 will appear to the PC 112 as a disk. The user may then access the camera 110 by double-clicking the "My computer" icon on the Windows desktop in step 160. This causes the "My computer" window to open, which shows all the drives available to the PC 112, including the digital camera 110.

In a one embodiment of the present invention, the user manually opens the HTML file 140 by first double-clicking the camera 110 icon in step 162 to cause a "Camera 110" window to open showing folder icons, files, and images on the camera 110's removable memory 120. To then open the HTML file 140 and to view the camera 110 images, the user double clicks the icon (Browse.htm) for the HTML file 140 in step 164. In response, the PC's 112 default web browser 118 launches and opens the HTML file 140.

In an alternative embodiment, the process of opening the HTML file 140 and launching the web browser may be made automatic by providing a pre-stored autoplay.inf file on the removable memory 120. The autoplay.inf is a standard Windows OS file for automatically executing a specified file when the directory where the autoplay.inf file is located and accessed. Thus, by specifying the HTML file 140 in the autoplay.inf file, the HTML file 140 will automatically open in the web browser 118 without user intervention.

As will be appreciated by those with ordinary skill in the art, the HTML file 140 is interpreted by the web browser 118, which in turn, displays resulting web pages. The commands included in the HTML file 140 describe the logical structure of the web page. The HTML file 140 includes ASCII text with embedded HTML tags that instruct the web browser as to the appropriate font, position, etc., for the text. The images are also associated with HTML tags describing their attributes with respect to the web page (e.g., position, relative size, etc.). The web browser 118 interprets the HTML file 140 and displays the web page, or pages, described by the file. Thus, the process of generating an HTML file 140 is often referred to as generating a web page and the process of a web browser accessing and interpreting the. HTML file 140 is-often referred to as displaying a web page.

Figure 6C:
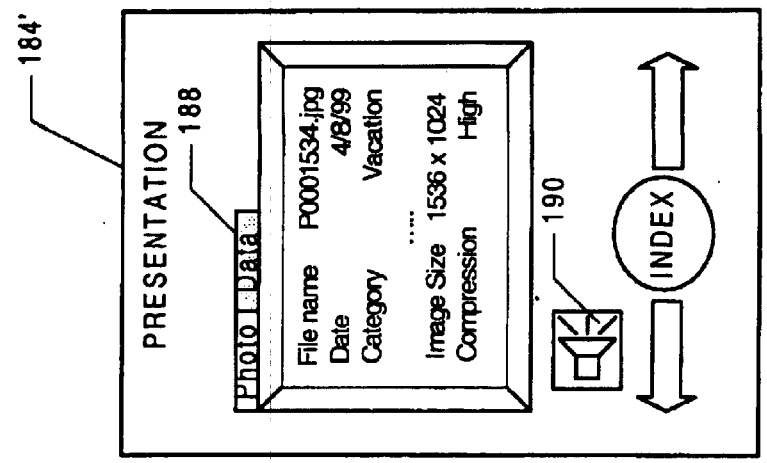
FIGS. 6A–6C are diagrams illustrating the content of the web pages generated by the opened HTML file.
Figure 6B:
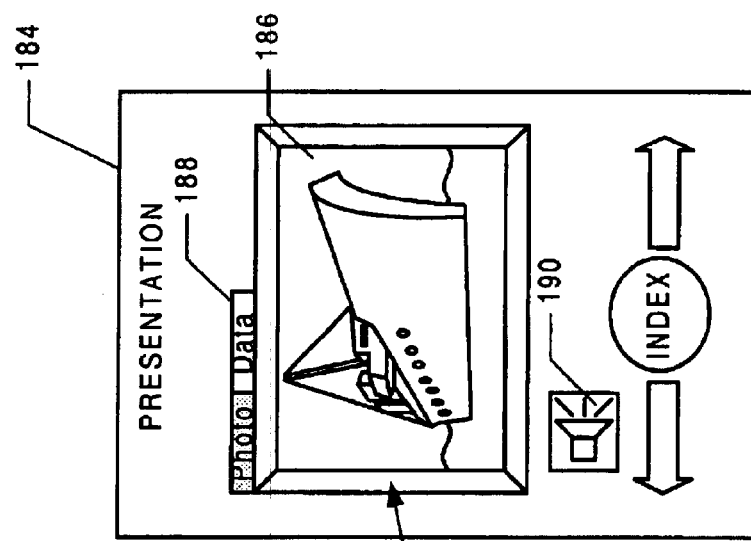
Figure 6A:
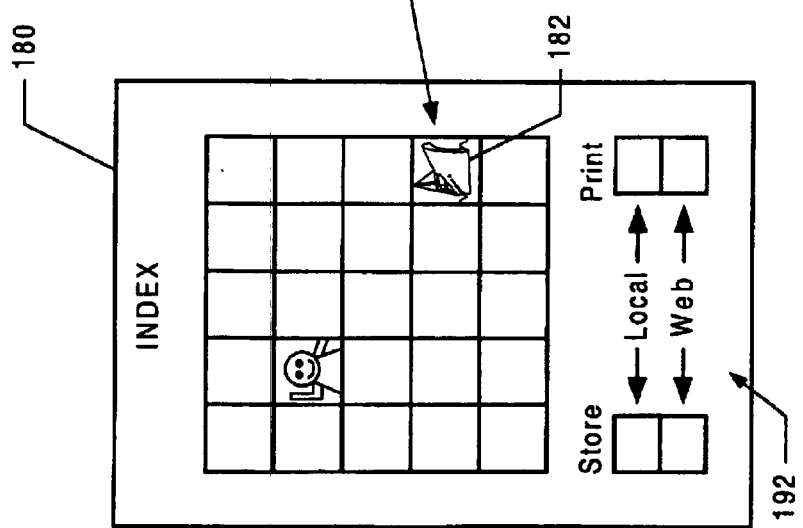

Referring now to FIGS. 6A–6C, diagrams illustrating the content of the web pages generated by the opened HTML file 140 are shown., FIG. 6A shows that in a preferred embodiment of the present invention, the first page of the HTML file 140 is an index page 180 which displays thumbnail images 182 so the user can readily see the contents of camera 110. Clicking one of the thumbnail images 182 on index page 180 causes a presentation page 184 to appear displaying a larger, window-sized view of the corresponding JPEG image 186, as shown in FIG. 6B. Optionally, a control may be added that allows the user to access a full-sized view of the image, which is typically much larger than the screen, whereby the user pans around the image using arrow keys.

As stated above, HTML file 140 includes references to the Java applets 156 that are generated along with HTML file 140 and are stored on removable memory 120. As the web browser interprets the HTML file 140 and encounters the references to the Java applets 156, the Java applets 156 are loaded by the browser and executed by a Java subsystem. When executed, the Java applets 156 locate the image files 144 on the removable memory 120 and extract and display the specific type of image data requested by the HTML file 140. Depending on the particular image file formats involved, the different types of image data that may be stored in an image file include any combination of compressed image data (typically in JPEG format), a thumbnail image, a screennail image, sound, and image tags that include information about the image (e.g., category, time, date, name, size, etc.). In the case of the compressed image data, the Java applets 156 are designed to decompress the data for display.

Using the Java applets 156, various buttons may also be displayed on web pages that allow the user to control the display, storage, and printing of the images. Referring to FIG. 6A for example, clicking on one of the control buttons 192 enables the user to upload and/or print the images locally on the PC 112 or on a destination on the World Wide Web. Clicking the "store" or "print" buttons causes a Java applet 156 to be executed that fetches the selected image(s) from the camera 110 and transfers it to the indicated destination.

The Java applets 156 may be provided with other types of functionality as well, such as determining which images, if any, have previously been uploaded, and then uploading only those images that have not. Another function could include automatically storing the images in a database. One primary advantage of saving images from the web browser 118 is that unlike in prior art systems, the images are stored directly to the destination without opening and recompressing the images, thereby maintaining image quality.

The HTML file generation process of the present invention may be implemented using several embodiments. In the first embodiment, the HTML file generation is a static process, while in the second and third embodiments, the HTML file generation, is a dynamic process.

The first embodiment is referred to as a static process because in this embodiment, the format of HTML file 140 is preset in the camera 110 and is designed to display a fixed number of web pages regardless of the number of images stored in the camera.

The second and third embodiments are referred to as dynamic processes because the HTML file 140 is automatically generated by the camera 110 to generate dynamic content. In the second embodiment, the HTML file 140 is dynamically generated each time the camera 110 is placed into connect mode. Dynamically generating the HTML file 140 means that the HTML file 140 will be customized to display the current contents of the camera 110 in the correct format. In this second embodiment, the HTML file 140 is generated by a script running in the camera 110. In the third embodiment, the dynamic content of the HTML file 140 is generated by a Java Generation Applet running on the host 112, rather than a script running on the camera 112. In this embodiment, the "Browser.HTM" file 140 is provided on the removable memory as an introduction page that references the index page 180 (FIG. 6A). When this introduction page is opened after the camera is properly connected to the PC 112, the "Browser.HTM" file 140 invokes the Java Generation Applet. The Java Generation Applet then scans the removable memory 120 for images 144 and generates the index page 180 accordingly.

In another aspect of the present invention, the user may also browse the images stored in the PC 112 even when the camera 110 is not connected by copying the HTML file 140 and accompanying media folder 146 to the directory on the PC 112 where the images are stored. By opening the window for the image directory and double clicking the HTML file 140, the user launches the web browser and may view the formatted web pages of the images stored on the PC's 112 hard drive. If the Java Generation Applet is used to build the index page, then the user will see both the images downloaded from the camera 110 as well as the images previously stored on the PC's 112 hard drive. In a preferred embodiment, the copying of the HTML file 140 and the media folder 146 to the PC is accomplished by providing a "Save to PC" option on the web pages.

In a further aspect of the present invention, the web browser 118 may not only be used to upload images from the camera to the PC 112 and the web, but also download images from the PC 112 or the web to the camera 110. Thus, the user is provided with the means for transferring images seamlessly between the camera 110, the PC 112, and the Internet.

Referring to FIG. 6B, other control buttons may also be provided on the web pages, such as the data tab 188 in the presentation page 184. Clicking the data tab 188 causes a Java applet 156 to be executed that extracts the tag information from the image file and displays the information to the user, as shown in FIG. 6C. Pressing the photo tab will return the user to the presentation page 184 of FIG. 6B. If the file format of the images supports sound, then a sound button 190 for playing any sound associated with the image may also be provided. Ideally, a button for recording sound for the images is also provided.

A preferred embodiment for automatically generating the HTML file 140 in the digital camera 110 using scripts will now be explained. Before describing the present invention in more detail, however, it is necessary to provide a brief overview of the internal environment of the digital camera 110.

Figure 7:
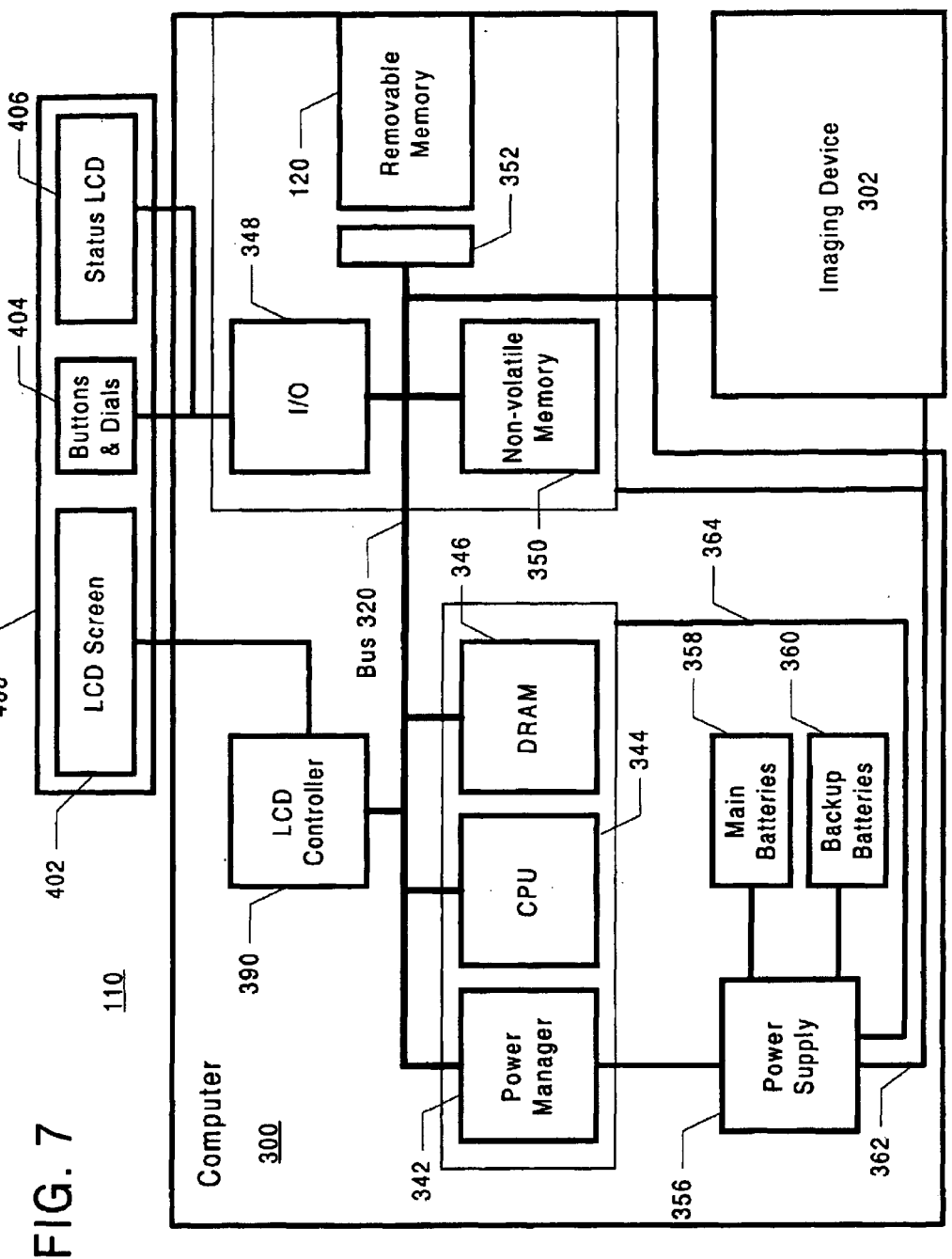
FIG. 7 is a block diagram of one preferred embodiment of a digital camera for use in accordance with the present invention

Referring now to FIG. 7, a block diagram of one preferred embodiment of a digital camera 110 is shown for use in accordance with the present invention. Camera 110 preferably comprises an imaging device 302, a system bus 320 and a computer 300. Imaging device 302 includes an image sensor, such as a charged coupled device (CCD) or a CMOS sensor, for generating a set of raw image data representing a captured image. In a preferred embodiment, system bus 320 provides connection paths between imaging device 302, an optional power manager 342, central processing unit (CPU) 344, dynamic random-access memory (DRAM) 346, input/output interface (I/O) 348, non-volatile memory 350, and buffers/connector 352 that connect an removable memory 120 to system bus 302.

CPU 344 may include a conventional microprocessor device for controlling the operation of camera 110. In the preferred embodiment, CPU 344 is capable of concurrently running multiple software routines to control the various processes of camera 110 within a multithreaded environment. For example, images may be captured at the same time that previously captured images are processed in the background to effectively increase the capture rate of the camera 110. In a preferred embodiment, CPU 244 runs an operating system that includes a menu-driven GUI and provides image processing through software, rather than hardware. An example of such software is the Digita™ Operating Environment by FlashPoint Technology of San Jose, Calif. Although CPU 344 is preferably a microprocessor, one or more DSP's (digital signal processor) or ASIC's (Application Specific Integrated Circuit) could also be used.

I/O 348 is an interface device allowing communications to and from computer 118. For example, I/O 348 permits the digital camera 110 the digital camera 110 to connect to and communicate with the PC. I/O 348 also interfaces with a plurality of buttons and/or dials 404, and an optional status LCD 406, which in addition to the LCD screen 402, are the hardware elements of the camera 110's user interface 408.

Non-volatile memory 350, which may typically comprise a conventional read-only memory or flash memory, stores a set of computer-readable program instructions to control the operation of camera 110. Removable memory 120 serves as an additional image data storage area and is preferably a non-volatile device, such a flash disk, readily removable and replaceable by a camera 110 user via buffers/connector 352.

Power supply 356 supplies operating power to the various components of camera 110. Power manager 342 communicates via line 366 with power supply 356 and coordinates power management operations for camera 110. In the preferred embodiment, power supply 356 provides operating power to a main power bus 362 and also to a secondary power bus 364. Power supply 356 is connected to main batteries 358 and also to backup batteries 360.

Dynamic Random-Access-Memory (DRAM) 346 is a contiguous block of dynamic memory that may be selectively allocated for various storage functions. DRAM 346 stores both raw and compressed image data and is also used by CPU 344 while executing the software routines used within computer 118. The raw image data received from imaging device 114 is temporarily stored in several input buffers (not shown) within DRAM 346. Once the raw image data is processed by CPU 344, it is stored in removable memory 120. After the image data has been processed and stored, it may also be displayed on the LCD screen 402 via LCD controller 390.

As stated above, the HTML file 140 is preferably created through the use of a script running on the digital camera 110. As used herein, a script is an interpreted program written with text-based commands. A script may also be written using other interpreted languages, such as BASIC, for example. A script in accordance with the present invention also includes a predefined set of commands which determine the formatted appearance of a web page. The script is interpreted by camera 110, which performs the actions, steps, functions, and the like, as dictated by the script. The predefined set of commands which determine the formatted appearance of a web page are referred to as a model. The model is designed (e.g., by the user, a third party developer, or the like) to give the resulting web page its distinctive appearance. The model functions as a "blue print" that defines the formatting and positioning information which determine the overall appearance of the resulting web page described by the HTML file 140. In executing a script in accordance with the present invention, the camera 110 generates the HTML file 140 referencing the stored images, wherein the HTML file. 140 is formatted in accordance with the script's predefined model.

In another embodiment, the script may also be programmed to prompt the user to select pictures from a set stored in the camera 110 before generating the HTML file 140. As the particular pictures are selected, the script may prompt the user for any descriptive information, annotations, and the like.

In both embodiments, the camera 110 produces a completed, formatted, HTML file (e.g., one or more web pages) which references the resulting images from the digital camera 110, without requiring the user to have any knowledge of HTML or HTML formatting.

In one embodiment of the present invention, one or more scripts (each providing a different look and feel) may be built-in into the camera 110 as preexisting functions. However, the camera 110 may be made more flexible by implemented the scripts as a set of program instructions that may be externally loaded into the camera 110. Once loaded in the camera 110, the instructions comprising the scripts are then preferably interpreted by the system software running on CPU 344. A selector script or a user preference selects which look and feel script to run.

Figure 8:
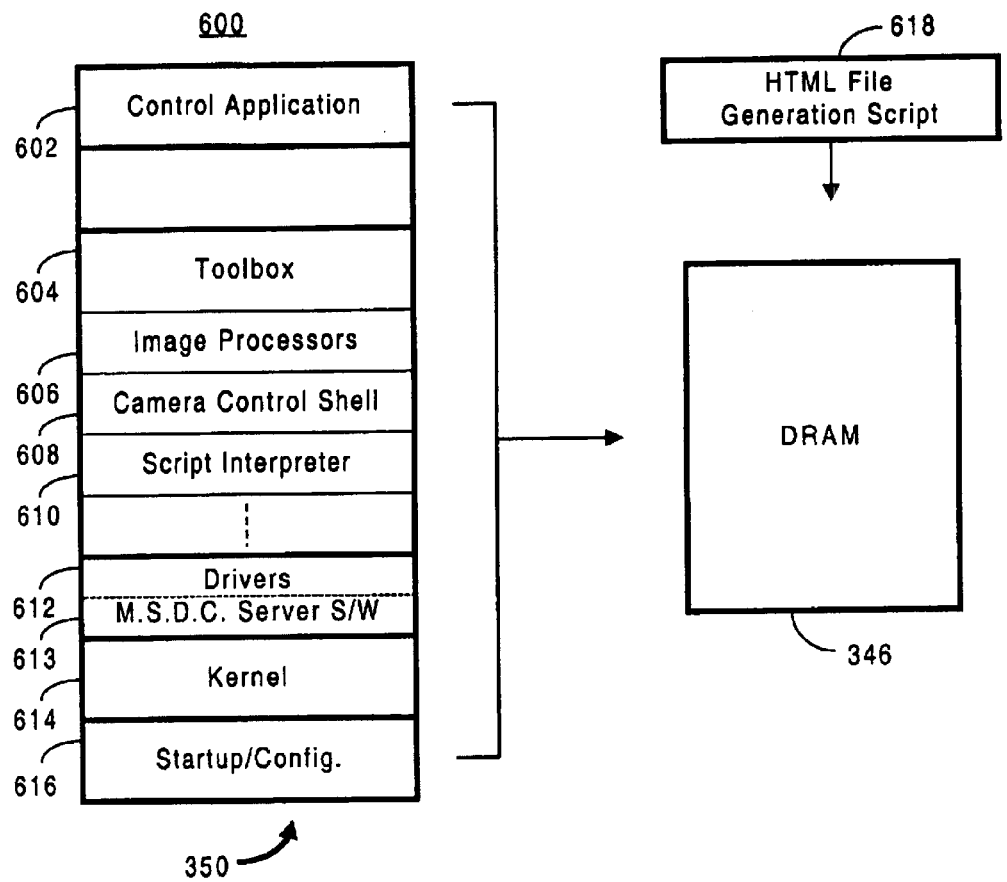
FIG. 8 is a block diagram illustrating the contents of the camera's ROM where the software is stored, and DRAM where the software is executed.

FIG. 8 is a block diagram illustrating the contents of ROM 350 where the software is stored, and DRAM 346 where the software is executed. In one embodiment, the software 600 may include a control application 602, a toolbox 604, drivers 612, a kernel 614, and a startup/configuration module 616. The control application 602 is the main program that controls high-level functions of the digital camera 110 and is responsible for interfacing with functions in the toolbox 604.

Toolbox 604 comprises selected function modules that control how the digital camera 110 captures and manipulates images. The modules may include image processors 606, a camera 110 control shell 608, and a script interpreter 610. Image processors 606 are programs for enhancing (e.g., adjusting the contrast, sharpening, converting the image to gray-scale, etc.) the digital image received from imaging device 114. Camera 110 control shell 608 receives and processes data structures for controlling camera 110 functions. Script interpreter 610 translates and executes the script statements.

Drivers 612 comprise program instructions for controlling various camera 110 hardware components, such as motor 234 (FIG. 2) and a flash (not shown). The drivers also include mass storage devices server-software 613 that identifies the camera 110 as a mass storage device class to the PC's operating system 116.

Kernel 614 comprises program instructions providing basic underlying camera 110 operating system services including synchronization routines, task creation, activation and deactivation routines, resource management routines, etc. Startup/configuration 616 comprises program instructions for providing initial camera 110 start-up routines such as the system boot routine and system diagnostics.

When the camera 110 is first turned on and booted up, the startup/configuration 616 module begins to execute and loads the drivers 612, the kernel 614, the control application 602, and system files containing configuration information into DRAM 346. Thereafter, operation of the camera 110 is passed to the control application 602. In an alternative embodiment, the software 600 may execute out of ROM 350 in order to reduce the size of DRAM 346.

The script for HTML file generation 618 may be loaded into the digital camera 110 from the removable memory 120 (FIG. 7), a PC 112, or a network, and stored in ROM 350. Once loaded into the camera 110, the script may be automatically executed when the camera 110 is switched to connect mode by passing the script to the script interpreter 610. The script interpreter 610 then translates and executes the instructions comprising the HTML file generation script 618 one-by-one to generate the resulting HTML file 140.

Figure 9:
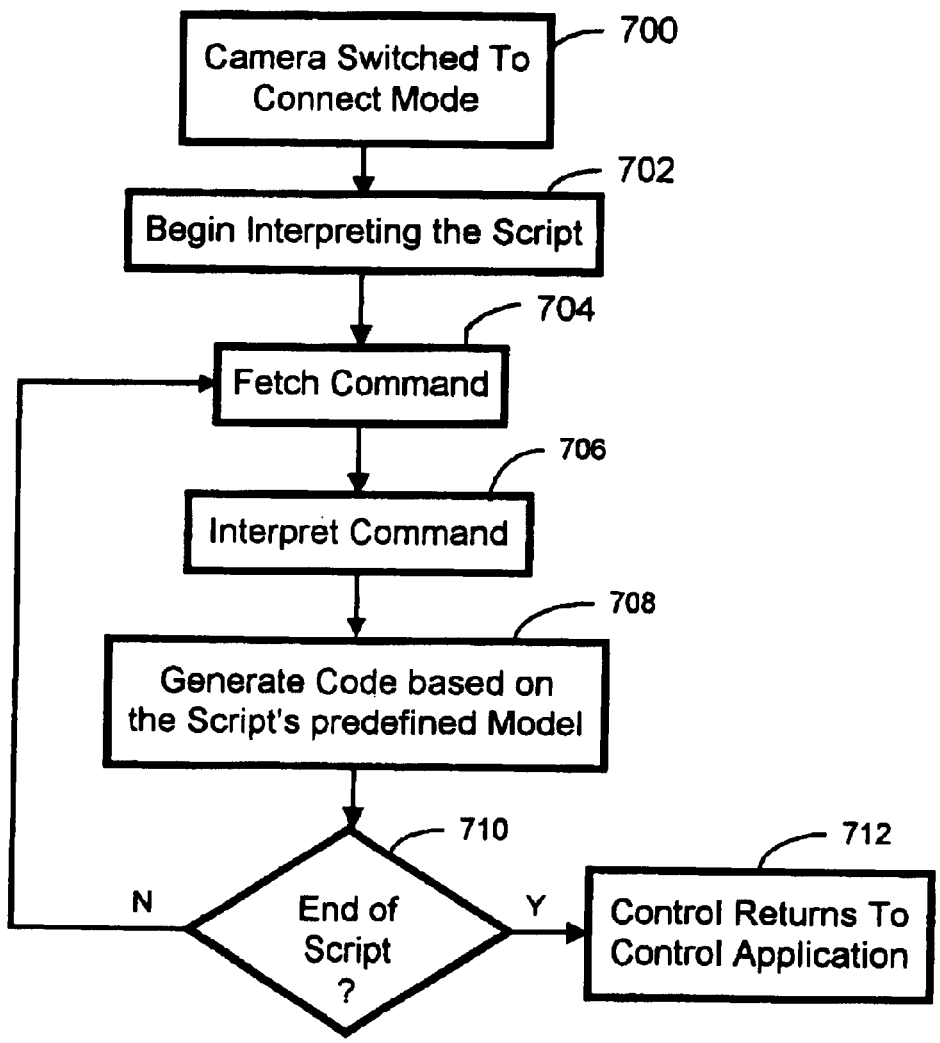
FIG. 9 is a flow chart illustrating an exemplary process of running a script for producing the HTML file in accordance with the dynamic HTML file generation process of the present invention.

FIG. 9 is a flow chart illustrating an exemplary process of running a script for producing the HTML file 140 in accordance with the dynamic HTML file generation, process of the present invention. The dynamic generation process is begun once the user places the camera 110 into connect mode in step 700. In response to the camera 110 being placed into connect mode, the script interpreter 610 begins interpreting the HTML file generation script 618 in step 702, and control is passed from the control application 602 to the script. In step 704, the script interpreter 610 fetches a script command comprising the HTML file generation script 618. Next, the script interpreter 610 interprets the script command in step 706.

The script may include many different types of script commands for performing different functions. For example, interpreting an open file command will cause the script interpreter 610 to open an HTML file 140 in which HTML commands, image references, and the like are to be stored. Interpreting a write command will cause a specified HTML command to be written to the file. And interpreting a close file command will cause the script interpreter 610 to close and save the HTML file 140, and so on. Thus, the interpretation of these different types of script commands generates HTML code in accordance with the script's predefined model in step 708.

If a particular script command represents the end of the script in step 710, then control is returned to the control application 602 in step 712, and one or more formatted HTML files 140 are available to the user for browsing the camera contents in accordance with the present invention. If the script command does not represent the end of the script in step 710, then the script interpreter 610 continues to fetch and interpret script commands in steps 704, 706 and 708 until the end of the script is reached in step 710.

An exemplary portion of the resulting HTML file for viewing camera contents in accordance with one embodiment of the present invention is shown below:

```
<html>
    <head>
        <title>Digita - Digital Camera Browser</title>
        <!--STYLE SHEETS-->
        <!------------------------------------------------------------------------>
        <!--specific layer styles-->
        <style type="text/css">
            <!--
            -->
        </style>
        <!--EXTERNAL JAVASCRIPT-->
        <!------------------------------------------------------------------------>
        <!--for scrollbar-->
        <SCRIPT LANGUAGE="JavaScript" SRC="dynlayer.js"></SCRIPT>
        <SCRIPT LANGUAGE="JavaScript" SRC="scroll.js"></SCRIPT>
        <!--INTERNAL JAVASCRIPT-->
        <!------------------------------------------------------------------------>
        <script language=javascript>
            //<!--
            imageList = new Array( "P0000102.JPG",
"P0000107.JPG", "P0000130.JPG", "P0000134.JPG", "P0000141.JPG",
"P0000177.jpg", "P0000179.JPG", "P0000272.jpg", "P0000286.jpg",
"P0000295.JPG", "P0000308.JPG", "P0000311.JPG", "P0000321.jpg",
"P0000326.jpg", "P0000327.JPG", "P0000335.jpg", "P0000384.jpg",
"P0000635.JPG", "P0000637.JPG", "P0000662.JPG");
            imageListSelected = new Array( 0, 0, 0, 0, 0, 0, 0,
0, 0, 0, 0, 0, 0, 0, 0, 0, 0, 0, 0 );
            //-->
        </script>
        <!--javascript to deal with different browser implementations of layers/css-->
        <script language=javascript>
            //<!--
            //layers will work on both browsers using this function in onload( )
            //----------------------------------------------------------------------
            var layerRef=" ", styleSwitch=" ";
            function pageInit( ){
                if (navigator.appName == "Netscape") {
                    layerRef="document.layers";
                    styleSwitch=" ";
                }
                else{
                    layerRef="document.all";
                    styleSwitch=".style";
                }
            }
            //-->
        </script>
        <!--initializes scroll object-->
        <SCRIPT LANGUAGE="JavaScript">
            //<!--
            function init( ) {
                myscroll.activate( )
            }
            // Initialize Scroll Object
            // change for position of images layer - scroll(left, top, width, height)
            myscroll = new Scroll(35, 106, 290, 355)
            myscroll.build( )
            writeCSS (
            myscroll.css
            )
```

-continued

```
//-->
</SCRIPT>
<!--preloading images-->
<script language=javascript>
        <!--
        if (document.images){
                //---------------------------------
                // PRELOAD IMAGES
                //---------------------------------
                presentOn = new Image( );
                presentOn.src = "graphics/nav/presentOn.gif";
                presentOff = new Image( );
                presentOff.src = "graphics/nav/presentOff.gif";
                presentOver = new Image( );
                presentOver.src = "graphics/nav/presentOver.gif";
                printOn = new Image( );
                printOn.src = "graphics/nav/printOn.gif";
                printOff = new Image( );
                printOff.src = "graphics/nav/printOff.gif";
                printOver = new Image( );
                printOver.src = "graphics/nav/printOver.gif";
                sendOn = new Image( );
                sendOn.src = "graphics/nav/sendOn.gif";
                sendOff = new Image( );
                sendOff.src = "graphics/nav/sendOff.gif";
                sendOver = new Image( );
                sendOver.src = "graphics/nav/sendOver.gif";
                saveOn = new Image( );
                saveOn.src = "graphics/nav/saveOn.gif";
                saveOff = new Image( );
                saveOff.src = "graphics/nav/saveOff.gif";
                saveOver = new Image( );
                saveOver.src = "graphics/nav/saveOver.gif";
                previewOff = new Image( );
                previewOff.src = "graphics/nav/previewOff.gif";
                previewOver = new Image( );
                previewOver.src =
"graphics/nav/previewOver.gif";
        }
        //-->
</script>
<script language=javascript>
        //changes a navigation image
        function changeImage(layerName, imgName, state) {
                if (document.images){
    eval(layerRef+'[layerName].document[layerName+"_"+imgName].src=eval(i
mgName + state+".src")');
                }
        }
        //changes current screen
        currentScreen = "preview";
        function changeScreen(newScreen) {
                //hide old screen
                hideScreen(currentScreen);
                //show new screen
                showScreen(newScreen);
                //update current Screen variable
                currentScreen = newScreen;
        }
        //hides a screen
        function hideScreen (screenToHide) {
                if (screenToHide == "preview") {
                        //hideLayer("previewLayer");
                        //hideLayer("previewImageLayer");
                        //hideLayer("previewImageBorderHLayer");
                        //hideLayer("previewImageBorderVLayer");
                        //hideLayer("imageInfoLayer");
                        //hideLayer("navPreviewLayer");
                }
                else if (screenToHide == "present") {
                        hideLayer("presentLayer");
                        hideLayer("navPresentLayer");
                        hideLayer("whiteLayer");
                }
                else if (screenToHide == "print") {
                        hideLayer("printLayer");
                        hideLayer("navPrintLayer");
                        hideLayer("whiteLayer");
                }
```

-continued

```
        else if (screenToHide == "send") {
            hideLayer("sendLayer");
            hideLayer("navSendLayer");
            hideLayer("whiteLayer");
        }
        else if (screenToHide == "save") {
            hideLayer("saveLayer");
            hideLayer("navSaveLayer");
            hideLayer("whiteLayer");
        }
    }
    //shows a screen
    function showScreen (screenToShow) {
        if (screenToShow == "preview") {
            showLayer("previewLayer");
            showLayer("previewImageLayer");
            if (document
["previewImage"].width>document ["previewImage"].height) {
    showLayer("previewImageBorderHLayer");
            }
            else if (document
["previewImage"].height>document ["previewImage"].width) {
    showLayer("previewImageBorderVLayer");
            }
            showLayer("imageInfoLayer");
            showLayer("navPreviewLayer");
        }
        else if (screenToShow == "present") {
            showLayer("whiteLayer");
            showLayer("presentLayer");
            showLayer("navPresentLayer");
        }
        else if (screenToShow == "print") {
            showLayer("whiteLayer");
            showLayer("printLayer");
            showLayer("navPrintLayer");
        }
        else if (screenToShow == "send") {
            showLayer("whiteLayer");
            showLayer("sendLayer");
            showLayer("navSendLayer");
        }
        else if (screenToShow == "save") {
            showLayer("whiteLayer");
            showLayer("saveLayer");
            showLayer("navSaveLayer");
        }
    }
}
```

In summary, a method and system for viewing images from a digital camera 110 on a host computer has been disclosed whereby a formatted HTML file referencing the images stored on the camera 110 is automatically generated that is accessible by the computer's web browser when the camera 110 is connected to the host computer as a mass storage device. According to the present invention, the user is able to view the contents of the camera 110 on the computer using a standard web browser interface, eliminating the need for the user to insert a CD-ROM into the PC 112 and install specialized communication and viewing software for that particular make of camera 110.

Although the present invention has been described in accordance with the embodiments shown, one of ordinary skill in the art will readily recognize that there could be variations to the embodiments and those variations would be within the spirit and scope of the present invention. For example, the present invention may be implemented in other types of image capture devices, such as an electronic device for archiving images that displays stored images on a television, for instance. In addition, software written according to the present invention may be stored on a computer-readable medium, such as a removable memory, or transmitted over a network, and loaded into the digital camera for execution. Accordingly, many modifications may be made by one of ordinary skill in the art without departing from the spirit and scope of the appended claims.

What is claimed is:

1. A method for viewing images from an image capture device on a host computer, comprising steps of:
   a) establishing communication between the image capture device and the host computer;
   b) automatically generating an Internet page description file in the image capture device that references the images stored therein;
   c) mounting the image capture device as a disk on the host computer; and
   d) opening the Internet page description file in a web browser on the host computer, wherein the images stored in the image capture device are displayed on the host computer through the web browser without the need for loading camera-specific communication software onto the host computer.

2. A method as in claim 1 wherein step b) further includes the step of:
   i) providing Java files along with the Internet page description file in the image capture device.

3. A method as in claim 2 wherein a portion of the images in the image capture device are stored as compressed image files, step d) further including the step of:

i) executing the Java files on the host computer for decompressing the compressed image files and for extracting information from the image files for display by the web browser.

4. A method as in claim 3 wherein step b) further includes the step of:

ii) automatically generating the Internet page description file when communication with the host computer is indicated.

5. A method as in claim 4 further including to step of:

e) storing the images displayed in the web browser on the host computer by copying the compressed image files from the image capture device directly to the host computer.

6. A method as in claim 5 wherein step e) further includes the steps of:

i) determining if any of the compressed image files have previously been copied to the host computer, and ii) copying only the compressed image files to the host computer that have not been previously copied.

7. A method as in claim 6 further including the steps of:

f) uploading the Java files and the Internet page description file to the host computer, and g) opening the Internet page description file in the web browser on the host computer to display the images stored in host computer.

8. A system for viewing images from an image capture device on a host computer, comprising:

a host computer having an operating system and a web browser; and a digital camera having a plurality of images stored therein in communication with the host computer such that the digital camera appears to the host computer as a disk, the digital camera including means for generating an Internet page description file that references the stored images, wherein the Internet page description is accessible by the web browser on the host computer to enable a user to view the images on the digital camera from the host computer without the need for loading camera-specific communication software onto the host computer.

9. A system as in claim 8 wherein each image in the digital camera is stored in a compressed image file, the Internet page description file further having associated Java files that are invoked by the web browser for decompressing the compressed image files and for extracting information from the image files for display by the web browser.

10. A system as in claim 9 wherein the means for generating the Internet page description file generates the Internet page description file in response to an indication that the digital camera is in communication with the host computer.

11. A system as in claim 10 wherein the Internet page description file is a HTML file.

12. A system as in claim 11 wherein the HTML file creates web pages that allow the user to transfer the images between the digital camera, the host computer, and the Internet.

13. A computer-readable medium containing program instructions for viewing images from a digital camera on a host computer, the program instructions for:

a) automatically generating in the digital camera an HTML file that references the images stored in the digital camera;

b) establishing a Universal Serial Bus (USB) connection between the digital camera and the host computer; and c) identifying the digital camera to the host computer as a mass storage device class whereby the digital camera appears to the host computer as a disk, thereby allowing a user to open the HTML file in a web browser on the host computer, wherein the images stored in the digital camera are displayed on the host computer through the web browser without the need for loading camera-specific communication software onto the host computer.

14. A computer-readable medium an in claim 13 wherein instruction a) further includes the instruction of:

i) automatically generating an HTML file in response to the digital camera being placed into connect mode.

15. A computer-readable medium as in claim 14 wherein instruction a) further includes the instruction of:

ii) providing Java files along with the HTML file in the digital camera.

16. A computer-readable medium as in claim 15 wherein the HTML file includes an introduction page referencing an index page, further including the instruction of:

d) executing a Java Generation Applet on the host computer that scans the digital. camera for images and generates the index page accordingly.

17. A computer-readable medium as in claim 15 wherein a portion of the images in the digital camera are stored as a compressed image files, further including the instruction of:

d) executing the Java files on the host computer for decompressing the compressed image files and for extracting information from the image files for display by the web browser.

18. A computer-readable medium as in claim 17 further including the instruction of:

e) storing the images displayed in web browser on the host computer by copying the compressed image files from the digital camera directly to the host computer.

19. A computer-readable medium as in claim 18 wherein instruction e) further includes the instructions of:

i) determining if any of the compressed image files have previously been copied to the host computer, and ii) copying only the compressed image files images to the host computer that have not been previously copied.

20. A computer-readable medium as in claim 19 further including the instructions of:

uploading the Java files and the HTML file to the host computer, and g) opening the HTML, file in the web browser on the host computer to display the images stored in host computer.

* * * * *